(12) United States Patent
Vignon et al.

(10) Patent No.: US 9,453,458 B2
(45) Date of Patent: Sep. 27, 2016

(54) ELECTRICAL ARCHITECTURE OF A HYBRID VEHICLE, HYBRID VEHICLE AND CONTROL METHOD

(75) Inventors: Antoine Vignon, Igny (FR); Nicolas Fremau, Saint Remy les Chevreuses (FR); Sid-Ali Randi, Chambery (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 160 days.

(21) Appl. No.: 14/129,825

(22) PCT Filed: May 25, 2012

(86) PCT No.: PCT/FR2012/051190
§ 371 (c)(1),
(2), (4) Date: Jun. 18, 2014

(87) PCT Pub. No.: WO2013/001194
PCT Pub. Date: Jan. 3, 2013

(65) Prior Publication Data
US 2014/0290592 A1   Oct. 2, 2014

(30) Foreign Application Priority Data
Jun. 28, 2011   (FR) ..................................... 11 55753

(51) Int. Cl.
| | |
|---|---|
| *F02B 63/04* | (2006.01) |
| *B60K 6/48* | (2007.10) |
| *F16H 3/089* | (2006.01) |
| *B60K 6/28* | (2007.10) |

(52) U.S. Cl.
CPC ................. *F02B 63/04* (2013.01); *B60K 6/28* (2013.01); *B60K 6/48* (2013.01); *F16H 3/089* (2013.01);
(Continued)

(58) Field of Classification Search
CPC ........... F02B 63/04; B60K 6/28; B60K 6/48; F16H 3/089

USPC ............................................................. 123/2
See application file for complete search history.

(56) References Cited

U.S. PATENT DOCUMENTS

| | | | |
|---|---|---|---|
| 2001/0039230 A1* | 11/2001 | Severinsky et al. ............... 477/3 |
| 2006/0116797 A1 | 6/2006 | Moran | |

(Continued)

FOREIGN PATENT DOCUMENTS

| | | |
|---|---|---|
| DE | 103 05 639 A1 | 3/2004 |
| EP | 2 281 727 A1 | 2/2011 |
| FR | 2 933 357 | 1/2010 |

OTHER PUBLICATIONS

U.S. Appl. No. 14/354,435, filed Apr. 25, 2014, Fremau, et al.
(Continued)

*Primary Examiner* — Lindsay Low
*Assistant Examiner* — Kevin Lathers
(74) *Attorney, Agent, or Firm* — Oblon, McClelland, Maier & Neustadt, L.L.P.

(57) ABSTRACT

An electrical architecture of a hybrid motor vehicle including a combustion engine driving an alternator that recharges a low-voltage on-board battery connected to a starter of and to a vehicle on-board network, an electric traction machine powered by a high-voltage traction battery, and a hybrid transmission including a coupling mechanism that can occupy at least a first position in which the combustion engine is uncoupled from the drive train connecting the electric machine to vehicle wheels, a second position in which the wheels are driven by the combustion engine with or without top-up from the electric machine, and a third position in which the combustion engine and the electric machine are coupled to combine their respective torques, bound for the wheels. The combustion engine and the alternator constitute an electricity generator configured to supply energy requirements of the traction electric machine in an electric mode.

11 Claims, 10 Drawing Sheets

Figure 1:
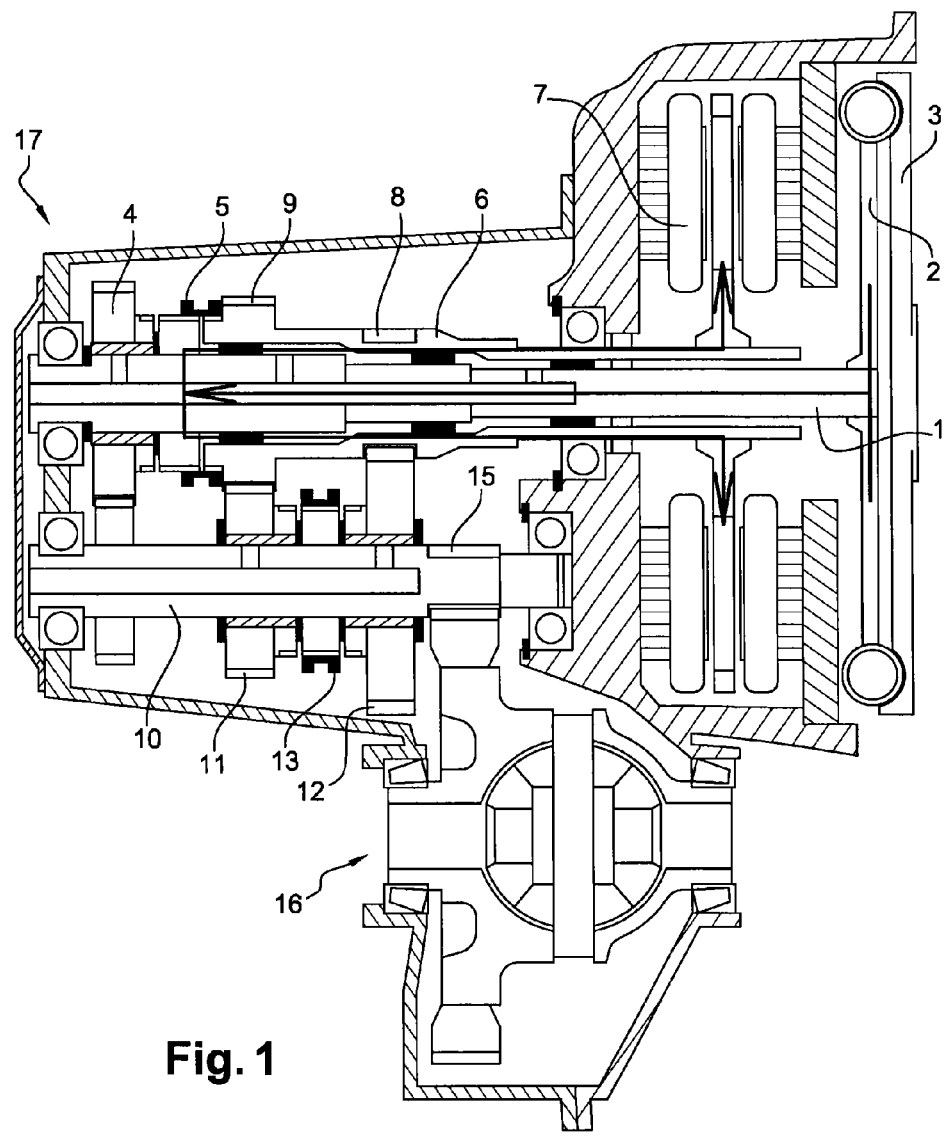

(52) U.S. Cl.
CPC ..... *B60Y 2400/112* (2013.01); *B60Y 2400/428* (2013.01); *B60Y 2400/607* (2013.01); *B60Y 2400/608* (2013.01); *Y02T 10/6221* (2013.01); *Y02T 10/6278* (2013.01)

(56) References Cited

U.S. PATENT DOCUMENTS

| | | | |
|---|---|---|---|
| 2006/0232238 | A1* | 10/2006 | Horii .......................... 320/104 |
| 2008/0011528 | A1 | 1/2008 | Verbrugge et al. |
| 2008/0097661 | A1 | 4/2008 | Moran |
| 2008/0177434 | A1 | 7/2008 | Moran |
| 2011/0073393 | A1 | 3/2011 | Sasaki |
| 2011/0087393 | A1 | 4/2011 | Verbrugge et al. |

OTHER PUBLICATIONS

International Search Report issued Aug. 6, 2012, in PCT/FR12/051190 filed May 25, 2012.

French Preliminary Search Report issued Feb. 7, 2012, in French 1155753 filed Jun. 28, 2011.

* cited by examiner

ELECTRICAL ARCHITECTURE OF A HYBRID VEHICLE, HYBRID VEHICLE AND CONTROL METHOD

The present invention relates to the electrical architecture of a vehicle comprising a driving combustion engine and an electric machine connected to the wheels of the vehicle through a hybrid transmission.

The object of the invention is the electrical architecture of a hybrid vehicle, whose combustion engine drives an alternator that recharges a low-voltage on-board battery connected to the starter of the combustion engine and to the vehicle on-board network and whose electric traction machine is powered by a high-voltage traction battery that can be regenerated by the combustion engine in neutral.

This invention finds a preferred application on a vehicle equipped with a hybrid transmission comprising two concentric primary shafts each incorporating at least one pinion descending onto a secondary shaft connected to the wheels of the vehicle allowing:
- the combustion engine to be uncoupled from the drive train connecting the electric machine to the wheels,
- the wheels to be driven by the combustion engine with or without top-up from the electric machine, or additionally
- the combustion engine and the electric machine to be coupled in such a way as to combine their respective torques, bound for the wheels.

The invention also relates to a hybrid vehicle presenting such an electrical architecture and to its control method.

The main advantage of hybrid transmissions is that they make the drive train of a vehicle benefit from two energy sources, combustion and electric, whose torque inputs can be combined in a mode called hybrid, or can be used separately, either in a "pure combustion mode" where the electric machine does not supply torque to the traction train, or in a "pure electric" mode where the combustion engine does not supply torque to the traction train. Other functionalities are also required, such as the ability to start the combustion engine from a standstill or when traveling, using the electric motor as a starter, or the ability to use the electric motor as an electricity generator to charge the batteries.

The problem of autonomy and charging of batteries is a crucial problem in hybrid vehicles. In order to recharge a traction battery that is fully discharged, either due to prolonged immobilization of the vehicle, or failure of the charge checking strategy, conventional hybrid vehicles can only resort to "roadside charging", imposing immobilization of the vehicle in order to run the traction machine as a generator using the combustion engine.

The present invention aims to eliminate this disadvantage, by supplying the energy requirements of the traction machine at low speed in the event of a full discharge of the vehicle traction battery.

In this aim, it proposes that the combustion engine and the on-board battery charging alternator constitute a low-cost electrical generator set capable of supplying the energy requirements of the electric traction machine in electric mode.

The traction battery and the on-board battery are preferably connected through a voltage transformer enabling the voltage between the traction battery and the on-board battery to be reduced.

In a first embodiment, the voltage transformer can have a reversible functioning, enabling it also to raise the voltage of a charging current circulating from the on-board battery in the direction of the traction battery.

In a second embodiment, the alternator is a high-voltage alternator (capable for example, of being controlled in low or high voltage by its wound rotor), directly connectable to the traction battery, associated or not with a voltage rectifying or regulating system.

Figure 6:
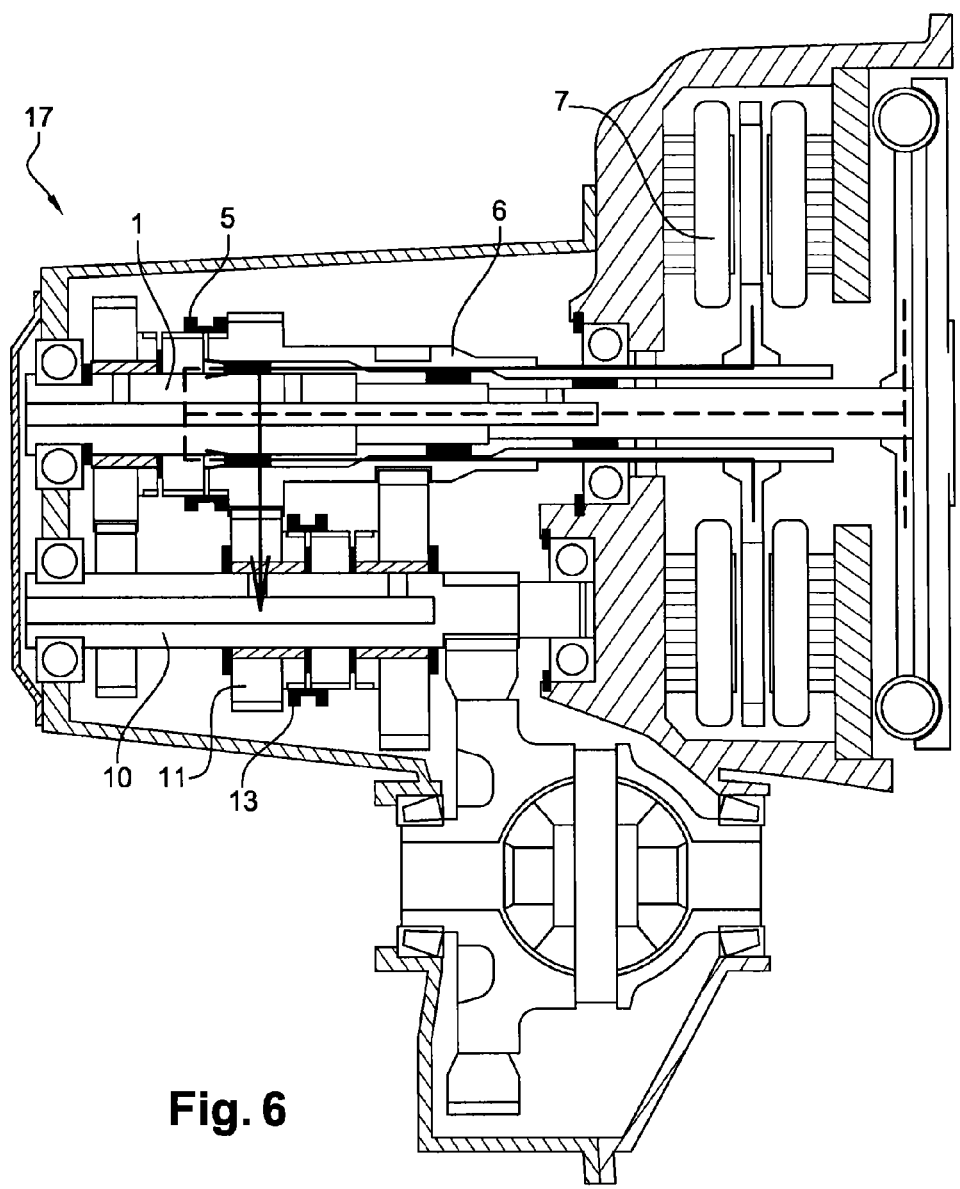
Figure 7:
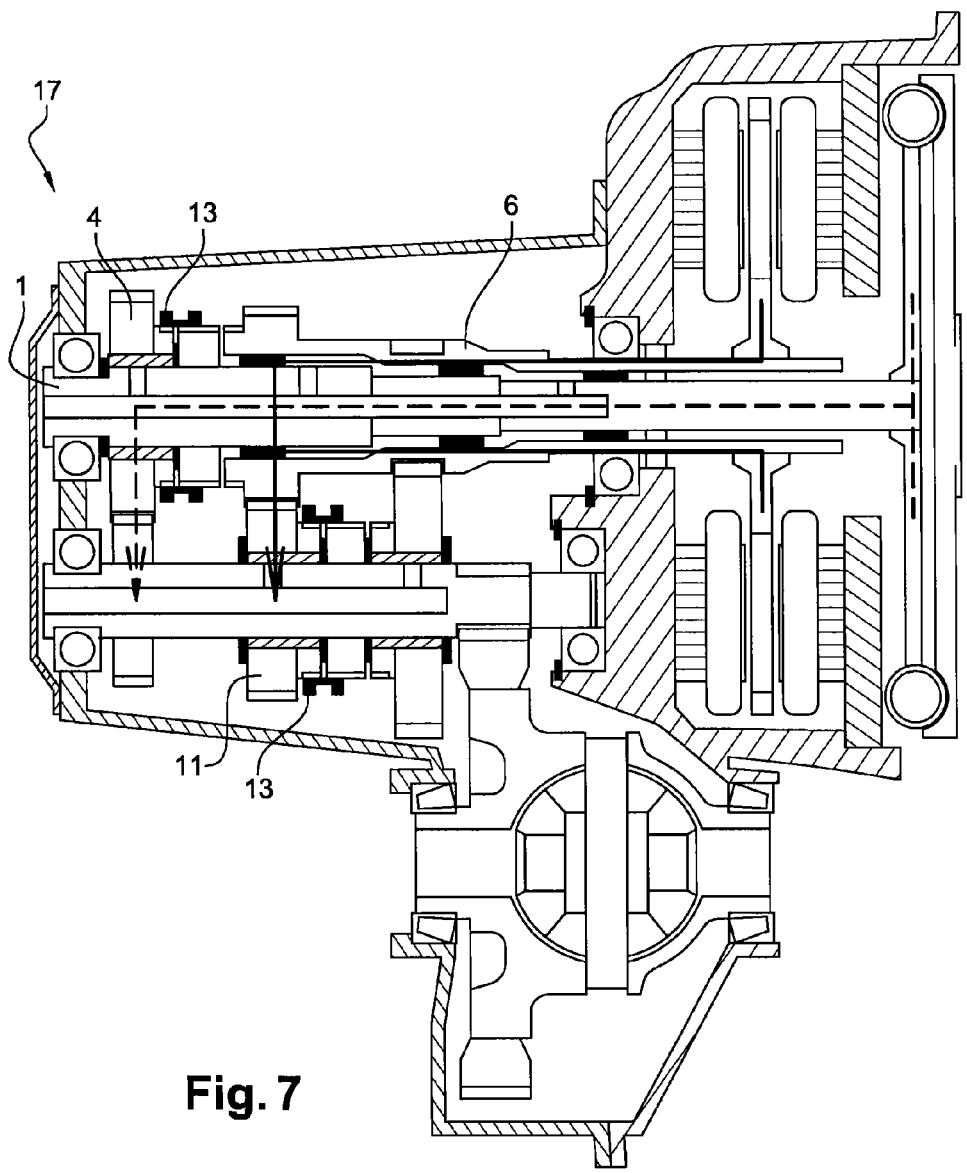
Figure 8:
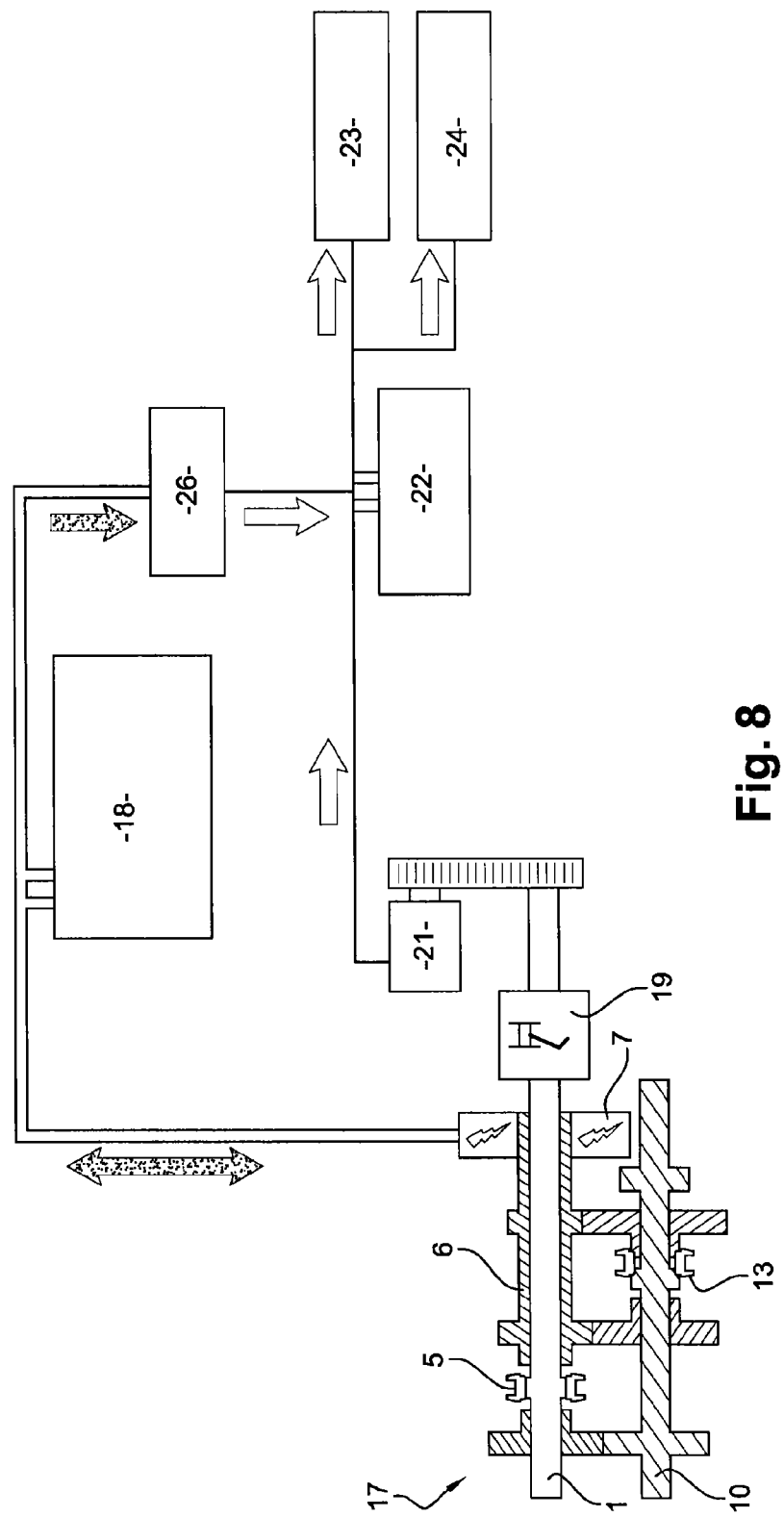
Figure 9:
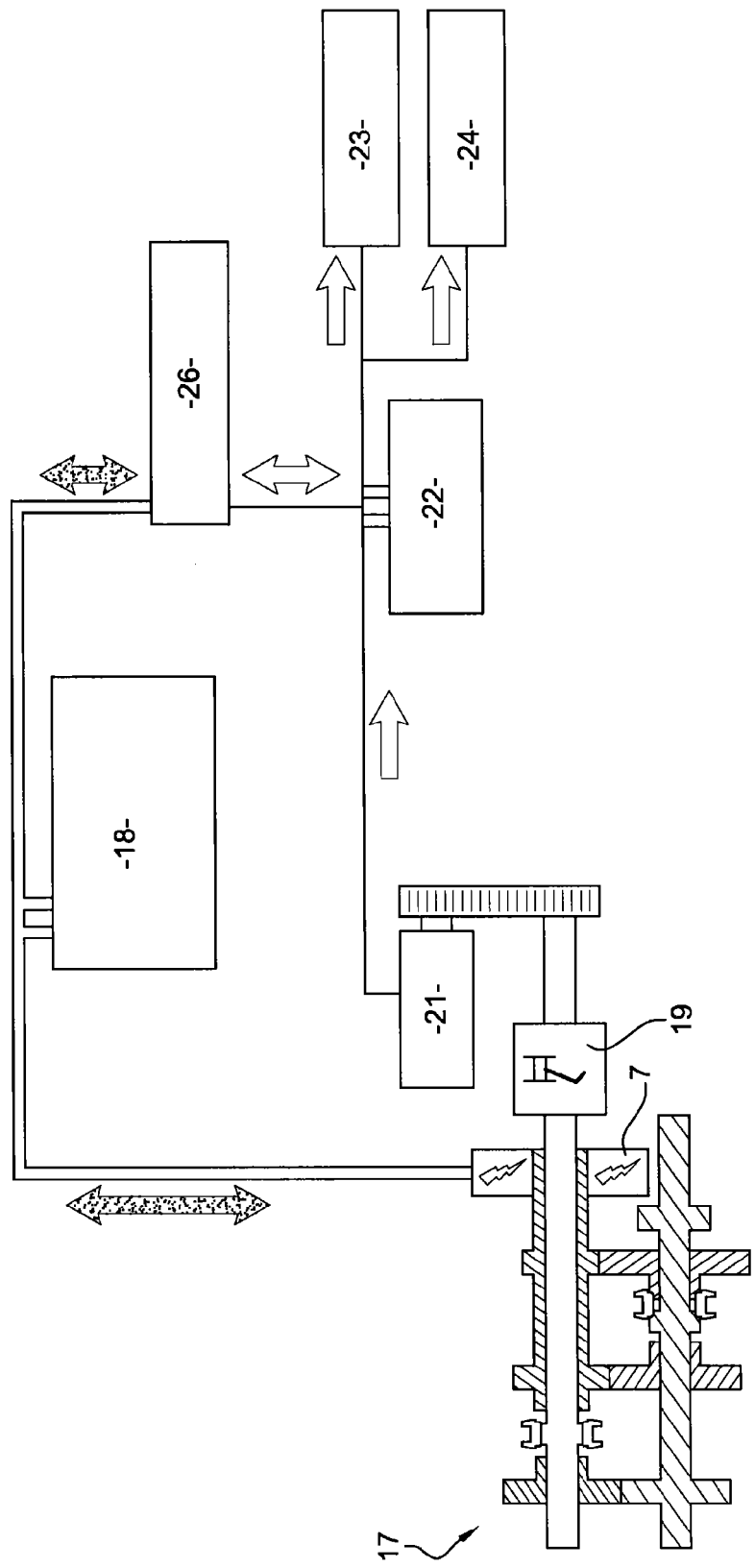
Figure 10:
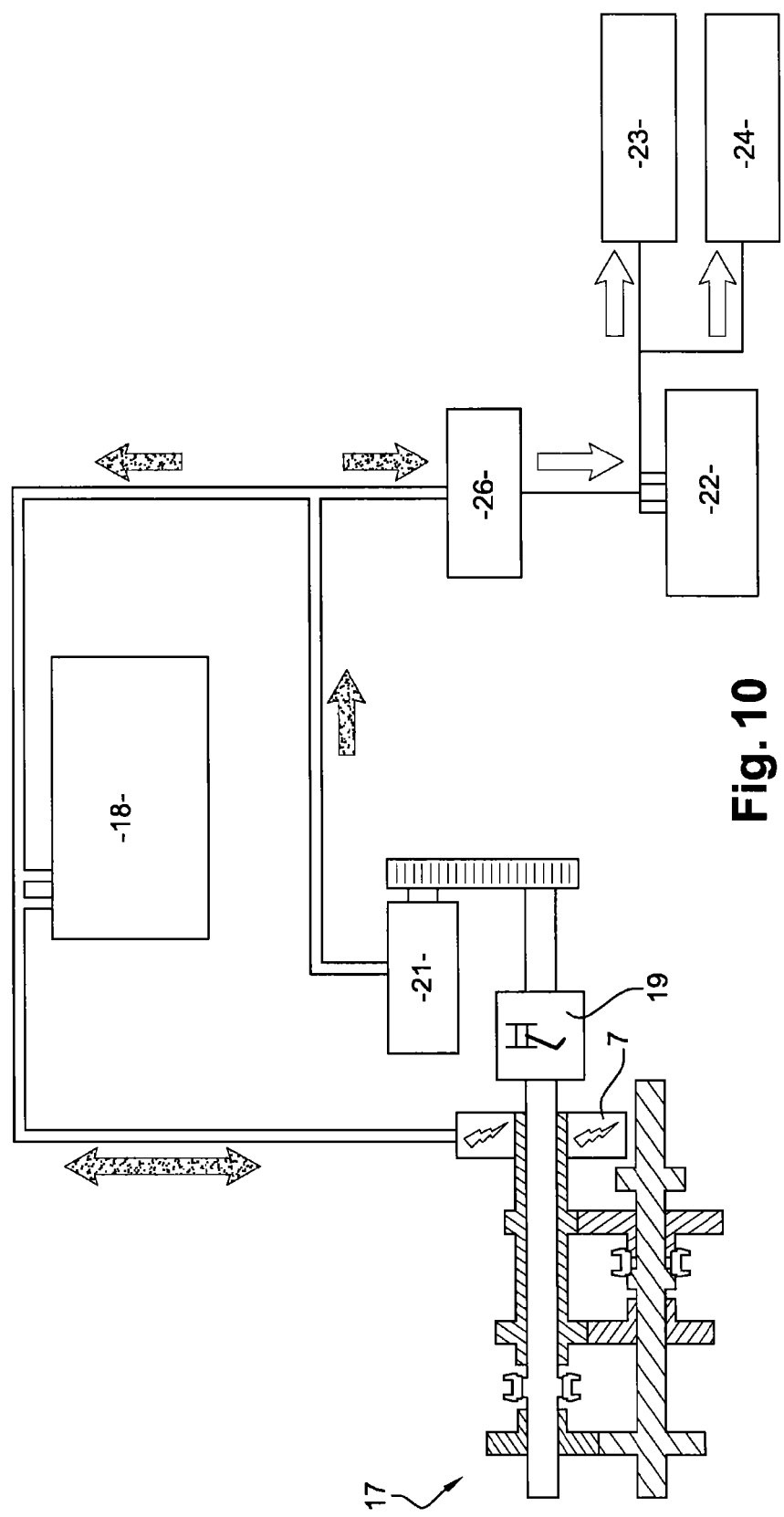

Other characteristics and advantages of the invention will emerge clearly from reading the following description of an embodiment, not restricted to the latter, and referring to the appended drawings, in which:

FIG. 1 illustrates the regeneration of the traction battery of a hybrid vehicle on an example of a hybrid transmission in neutral, FIGS. 2 to 7 illustrate the different functioning possibilities of this transmission, FIG. 8 illustrates a first electrical architecture appropriate to the transmission, FIG. 9 illustrates a first embodiment of the invention, and FIG. 10 illustrates a second embodiment of the invention.

The transmission 17 of FIGS. 1 to 7 comprises a solid primary shaft 1 directly connected through a filtration system 2 (damper hub, "damper", double flywheel or another) to the inertia flywheel 3 of a combustion engine (not illustrated). The solid shaft 1 supports an idler 4 capable of being connected to the former through a first coupling system 5 (positive clutch, synchronizer, or another type of coupler, progressive or not). A hollow primary shaft 6 is connected to the rotor of an electric machine 7. A secondary shaft 10 supports two idlers 11 and 12. One can connect both idlers 11, 12 to the primary shaft through a second coupling system 13 (positive clutch, synchronizer or another type of coupler, progressive or not). The secondary shaft 10 also supports a fixed pinion 14 and a pinion 15 descending in the direction of a differential 16 connected to the wheels (not illustrated) of the vehicle.

The first coupling means 5 can occupy at least three positions, in which:
- the combustion engine is uncoupled from the drive train connecting the electric machine 7 to the wheels (position 1),
- the combustion engine drives the wheels with or without top-up from the electric machine (position 2), and
- the combustion engine and the electric machine 7 are coupled in such a way as to combine their respective torques, bound for the wheels (position 3).

Figure 5:
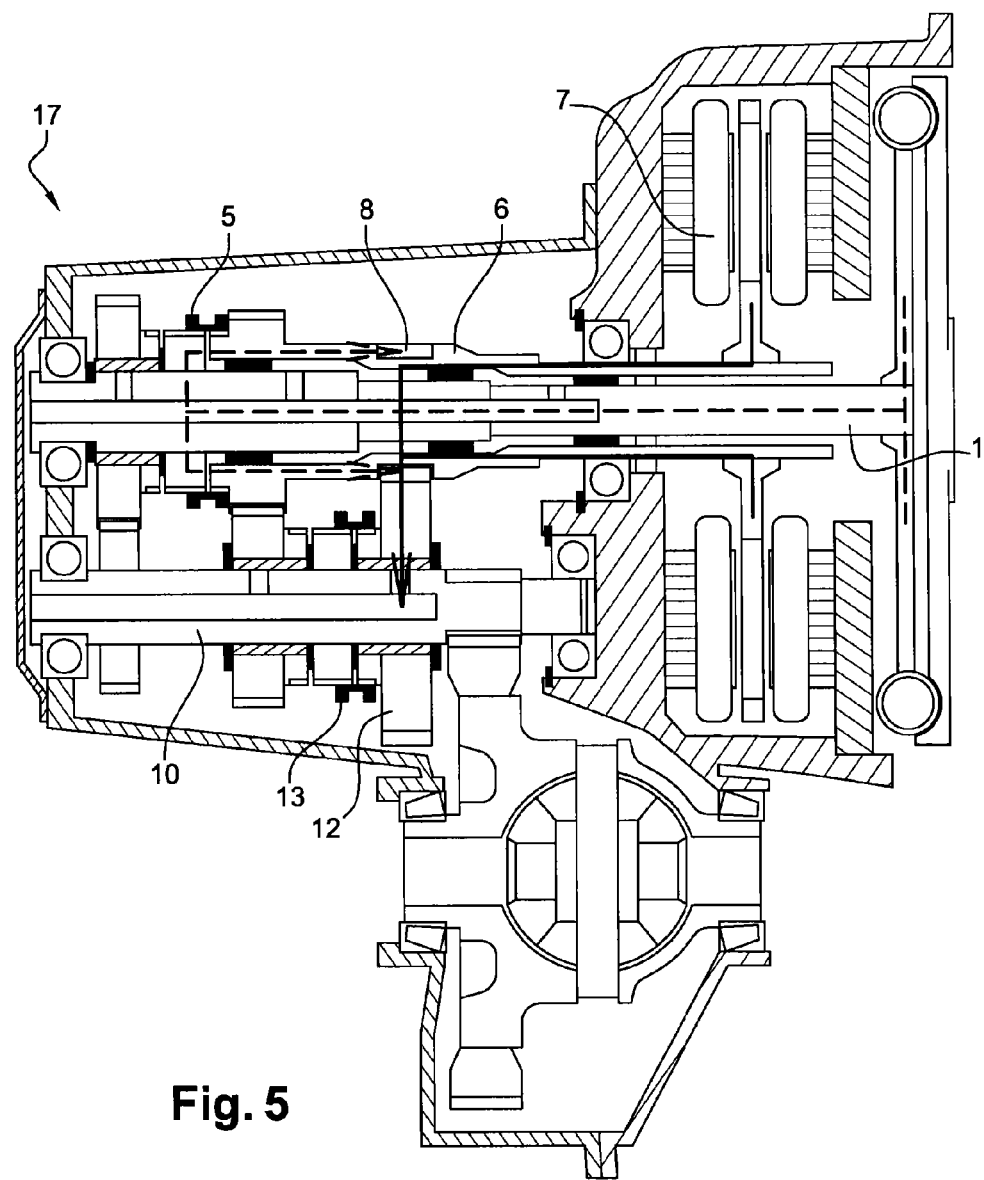

In FIG. 1, the first coupling system is in position 3, as it is on that on FIGS. 5 and 6, that is to say that it connects in rotation the solid primary shaft 1 and the hollow primary shaft 6. The second coupling system 13 is open. The transmission is therefore "in neutral". The rotating combustion engine can drive the electric traction machine then functioning as a generator for recharging the batteries of the immobilized vehicle.

Figure 2:
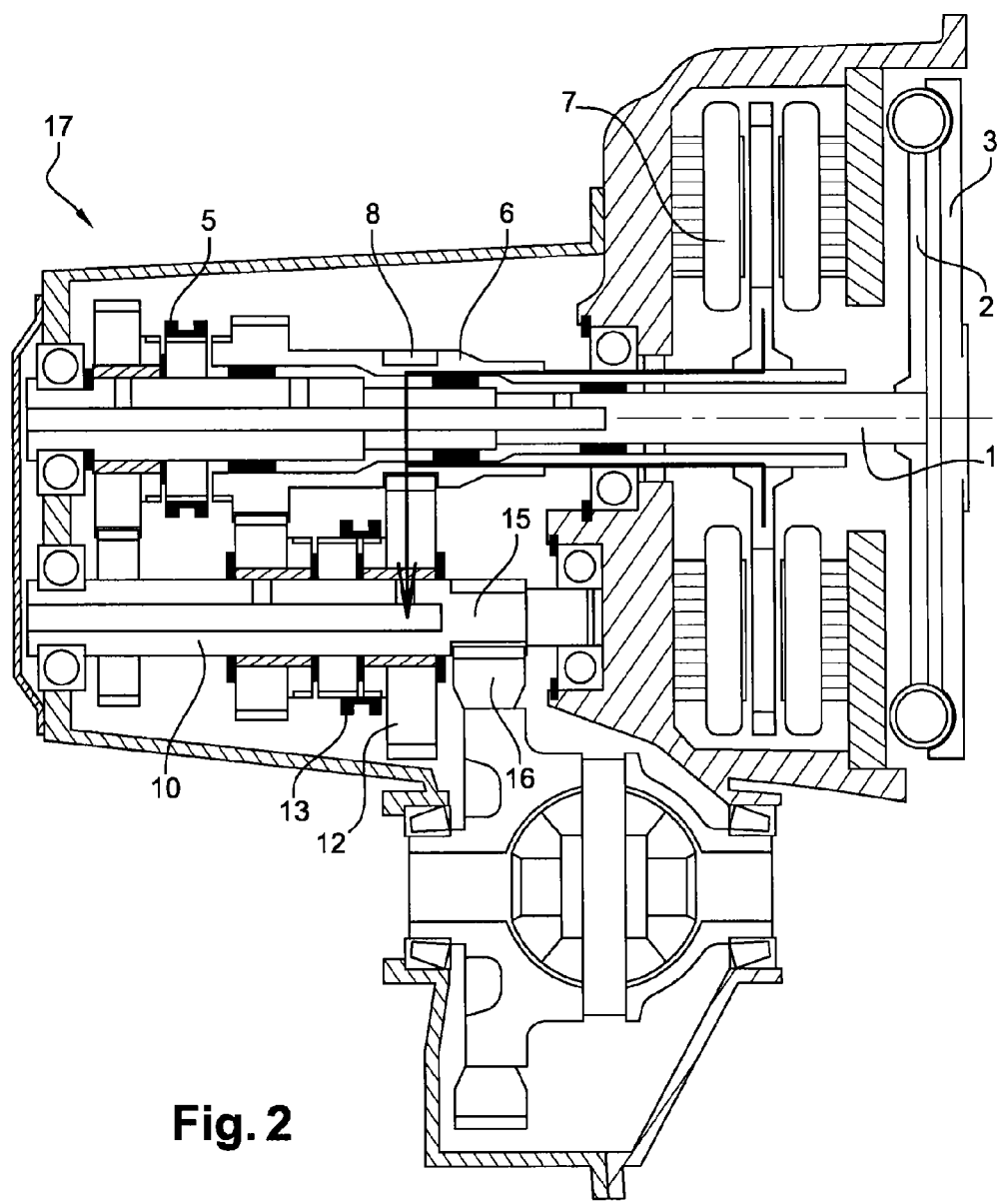

In FIG. 2, the first coupling system 5 is open (position 1), whereas the second coupling system 13 is closed in such a way as to make the idler 12 of the low ratio integral with the secondary shaft 10. The transmission is in electric mode at the low ratio, or first forward drive ratio.

Figure 3:
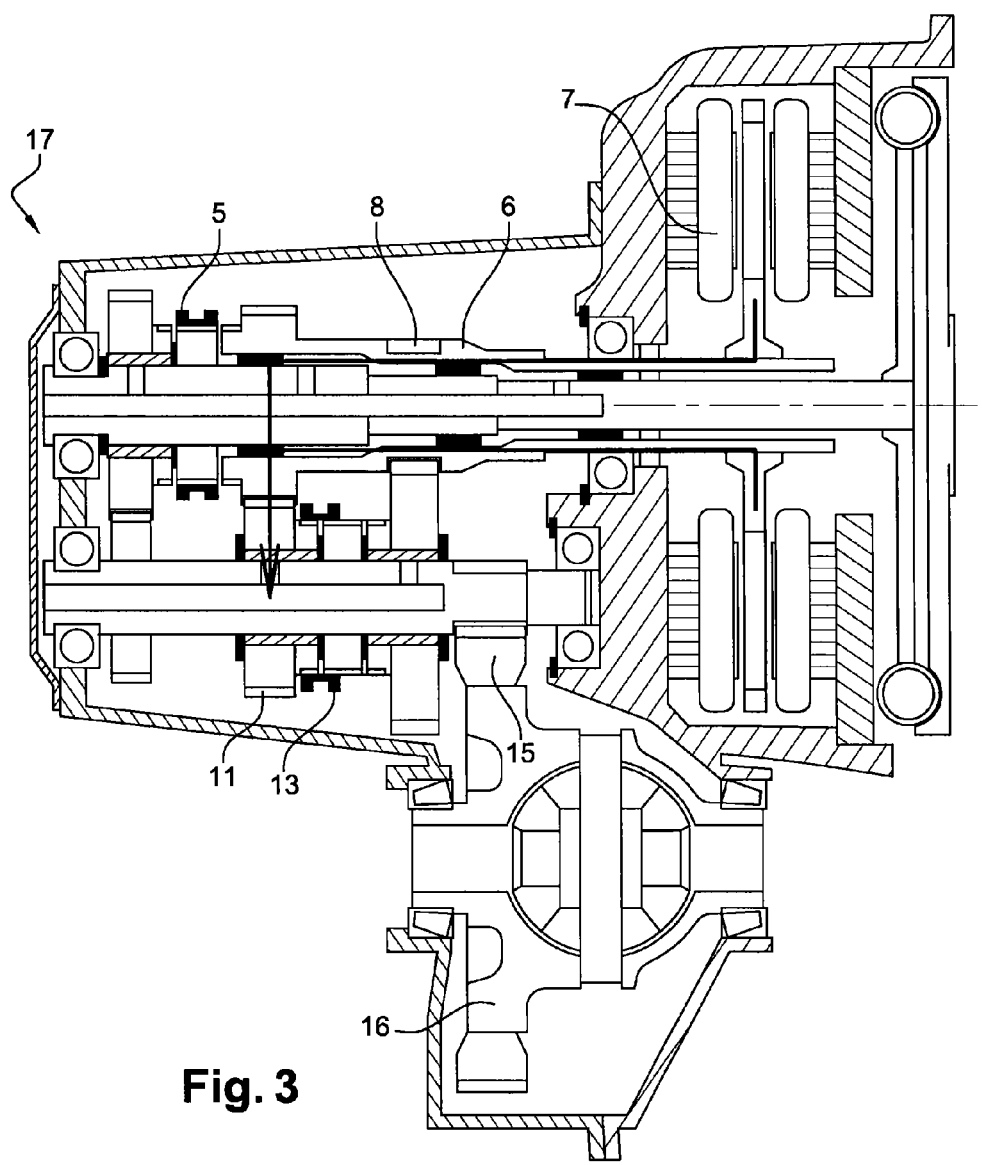

In FIG. 3, the first coupling system 5 is still open (position 1), whereas the second coupling system 13 is closed in such a way as to make the idler 11 of the intermediate ratio integral with the secondary shaft 10. The transmission is in electric mode at the intermediate ratio, or second forward drive ratio.

Figure 4:
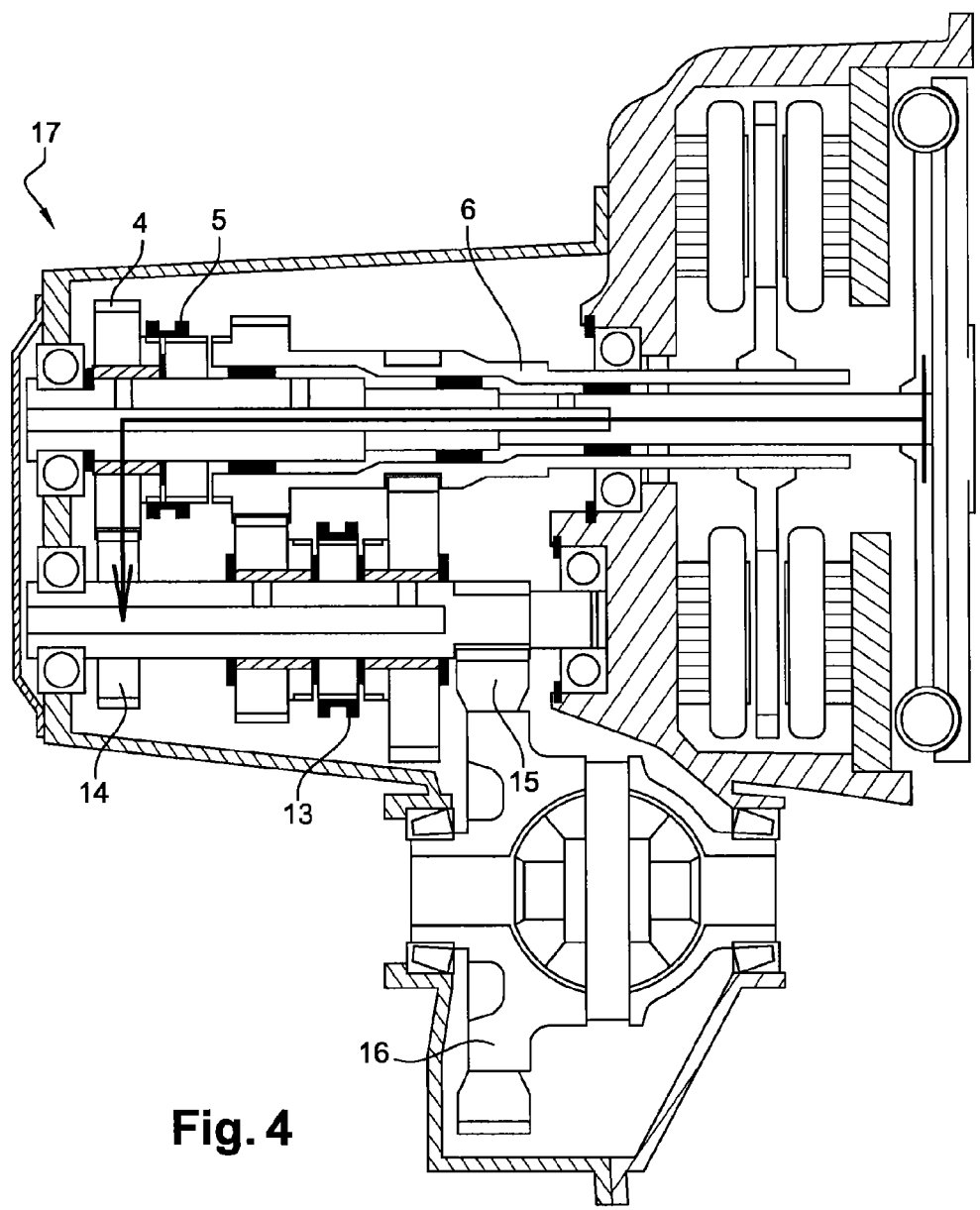

In FIG. 4, the first coupling system 5 is closed in position 2, in such a way as to make the idler 4 supported by the solid shaft 1 integral with it, whereas the second coupling means 13 is open. The transmission is at the ratio of high ratio, or third. The electric machine does not supply any torque.

In FIG. 5, the first coupling means 5 is closed in position 3 in such a way as to make the solid shaft 1 integral with the hollow shaft 6. The second coupling system 13 is closed in such a way as to make the idler 12 of the low ratio and the secondary shaft 10 integral. The transmission is in hybrid mode at the low ratio. The inputs from the combustion engine and the electric machine are combined on the drive train. They are transmitted from the primary hollow shaft 6 to the secondary shaft by the descent of pinions 8, 12.

In FIG. 6, the first coupling means 5 is still closed in position 3 as it is in FIG. 5. The solid primary shaft 1 is therefore integral with the hollow primary shaft 6. The second coupling system 13 is also closed; the idler 11 of the intermediate ratio is integral with the secondary shaft 10. The transmission is in hybrid mode at the intermediate ratio. The inputs from the combustion engine and the electric machine are combined on the drive train.

In FIG. 7, the first coupling system 5 is closed in position 2; it makes the idler 4 supported on the solid primary shaft 1 integral with it. Furthermore, the second coupling means 13 is closed in such a way as to make the idler 11 of the intermediate ratio integral with the secondary shaft 10. The transmission is in hybrid mode at the high ratio, with combination of the inputs from the combustion engine and the electric machine.

In FIG. 8, a hybrid transmission 17 such as the one described above is diagrammatically illustrated, on which it is possible to recognize the primary shafts 1, 6 and the secondary shaft 10, the combustion engine 19 and the electric traction machine 7. The electric machine 7 is electrically connected to the traction battery 18. The combustion engine 19 drives an alternator 26 that recharges the on-board battery 22, supplying the on-board network 23 and the starter 24 of the combustion engine 19. The alternator 21 supplies the on-board battery with low-voltage current. On the other hand, the current circulating between the combustion engine 19 and the traction battery 18 is a high-voltage current. In order to be able to recharge the on-board battery 22 from the traction battery, a current transformer 26 is installed between them. The transformer 26 reduces the voltage of the current circulating from the traction battery 18 in the direction of the on-board battery 22, but no charging current can circulate from the on-board battery 22 in the direction of the traction battery 18. The traction battery 18 can therefore be recharged at a standstill "at the roadside" by the combustion engine functioning as a generator, with the transmission in neutral in accordance with FIG. 1, but it cannot be recharged by the on-board battery 22.

In FIG. 9, the two batteries 18, 22 are still connected through the voltage transformer 26. However, the transformer 26 is now a reversible transformer capable not only of reducing the voltage between the traction battery 18 and the on-board battery 22, but moreover of raising the voltage of a charging reverse current coming from the on-board battery 22 in the direction of the traction battery 18. The current can therefore circulate in both directions between the two batteries. Furthermore, the alternator has been reinforced in order to be able to satisfy the energy requirements of the traction battery, at least when the vehicle moves off and travels at low speed. The combustion engine and the alternator therefore constitute an electricity generator set capable of supplying the energy requirements of the electric traction machine when the vehicle moves off and travels at low speed in electric mode.

In FIG. 10, the alternator 21 is a high-voltage alternator, for example, a rewound alternator, directly connectable to the traction battery 18, without the relay of a voltage transformer. The latter is still present in the architecture. However, the alternator 21 is now connected to the traction battery 18, between the voltage transformer 26 and this battery. As before, the combustion engine 19 and the alternator 21 constitute an electricity generator set capable of supplying the energy requirements of the electric traction machine 7 when the vehicle moves off and travels at low speed in electric mode. However, the on-board battery 22 is outside the charging circuit of the traction battery 7, and the current transformer only intervenes for a possible recharging of the on-board battery from the traction battery. It does not therefore need to be reversible.

When the combustion engine has started (in principle with the help of the starter powered by the on-board battery), it is possible to make the vehicle move off and travel in electric mode up to a certain speed threshold. The combustion engine is then used as a recharging generator for the traction battery in electric mode, through the on-board battery, whereas all the driving energy is supplied by the electric machine 7. This functioning is typically that of a "series hybrid" vehicle, whereas the transmission is designed from the outset as that of a "parallel hybrid" where the combustion engine and the electric machine both transmit mechanical energy to the wheels. It allows the vehicle to be made to move off from a standstill and to make it travel at low speeds. As soon as the displacement speed of the vehicle is sufficient to connect the combustion engine to the wheels through the transmission, one can change the mode and switch for example to another mode, for example to combustion (FIG. 4), or hybrid (FIG. 5 or 6) mode, where the combustion engine is coupled to the wheels.

The invention makes it possible to take advantage of the transmission in a supplementary functioning mode, called "series hybrid", in the event of a complete discharge of the traction battery by using the electric machine as a driving energy source supplied by the traction battery, which is recharged by the combustion engine functioning as a generator. This supplementary mode can be implemented for a modest cost, for example by rewinding the alternator to high voltage, associated with a regulation of the voltage, without requiring the presence of a controlling inverter for a second machine. Depending on the dimensioning of the mechanical and electrical units of the transmission, this functioning mode called "series hybrid" is possible, at least at a first low transmission ratio, up to a speed threshold beyond which, either the driving energy of the electric machine and that of the electric machine combine in hybrid mode, or the only driving source used is the combustion engine.

The invention claimed is:

1. An electrical architecture of a hybrid motor vehicle comprising:
   a combustion engine driving an alternator that recharges a low-voltage on-board battery connected to a starter of the combustion engine and to a vehicle on-board network;
   an electric traction machine powered by a high-voltage traction battery; and
   a hybrid transmission including coupling means that can occupy at least a first position in which the combustion engine is uncoupled from a drive train connecting the electric machine to wheels of the vehicle, a second position in which the wheels are driven by the combustion engine with or without top-up from the electric machine, and a third position in which the combustion engine and the electric machine are coupled to combine their respective torques, bound for the wheels, wherein in the third position the coupling means connects a solid shaft, connected to the combustion engine, to a hollow shaft, connected to the electric machine, wherein the solid shaft is disposed within an interior space of the hollow shaft;

wherein the combustion engine and the alternator constitute an electricity generator set configured to supply energy requirements of the electric traction machine in an electric mode.

2. The electrical architecture as claimed in claim 1, wherein the traction battery and on-board battery are connected by a voltage transformer enabling voltage between the traction battery and the on-board battery to be reduced.

3. The electrical architecture as claimed in claim 2, wherein the voltage transformer has a reversible functioning enabling it to raise a voltage of a charging current circulating from the on-board battery in a direction of the traction battery.

4. The electrical architecture as claimed in claim 1, wherein the alternator is a high-voltage alternator directly connectable to the traction battery.

5. The electrical architecture as claimed in claim 4, wherein the alternator is connected to the traction battery via a connection point that is between the voltage transformer and the traction battery.

6. A hybrid vehicle, comprising an electrical architecture according to claim 1.

7. The electrical architecture as claimed in claim 1, wherein the solid shaft is connected to a flywheel of the combustion engine and the hollow shaft is connected to a rotor of the electric machine.

8. A control method of a hybrid vehicle that includes a combustion engine driving an alternator that recharges a low-voltage on-board battery connected to a starter of the combustion engine and to a vehicle on-board network; an electric traction machine powered by a high-voltage traction battery; and hybrid transmission including coupling means that can occupy at least a first position in which the combustion engine is uncoupled from a drive train connecting the electric machine to wheels of the vehicle, a second position in which the wheels are driven by the combustion engine with or without top-up from the electric machine, and a third position in which the combustion engine and the electric machine are coupled to combine their respective torques, bound for the wheels, wherein in the third position the coupling means connects a solid shaft, connected to the combustion engine, to a hollow shaft, connected to the electric machine, wherein the solid shaft is disposed within an interior space of the hollow shaft; wherein the combustion engine and the alternator constitute an electricity generator set configured to supply energy requirements of the electric traction machine in an electric mode, the method comprising:

recharging the traction battery while the vehicle is traveling in the electric mode.

9. The control method of a hybrid vehicle as claimed in claim 8, wherein the combustion engine is used as a generator to recharge the traction battery when the vehicle is moving off in electric mode.

10. The control method as claimed in claim 8, using the electric machine as an only source of driving energy up to a speed threshold, and then coupling the combustion engine to the wheels.

11. The control method as claimed in claim 8, wherein the electric traction machine is used as an only source of driving energy up to a speed threshold, beyond which operation can pass to a hybrid mode or to a combustion mode.

* * * * *